US009559916B2

(12) United States Patent
Zaents et al.

(10) Patent No.: US 9,559,916 B2
(45) Date of Patent: Jan. 31, 2017

(54) METHODS AND SYSTEMS FOR TRACKING TIME IN A WEB-BASED ENVIRONMENT

(71) Applicant: The Forcemeister, Inc., Brooklyn, NY (US)

(72) Inventors: Leonid Zaents, Tel Aviv (IL); Shahaf Galil, Brooklyn, NY (US)

(73) Assignee: THE FORCEMEISTER, INC., Brooklyn, NY (US)

(*) Notice: Subject to any disclaimer, the term of this patent is extended or adjusted under 35 U.S.C. 154(b) by 989 days.

(21) Appl. No.: 13/653,991

(22) Filed: Oct. 17, 2012

(65) Prior Publication Data
US 2014/0108644 A1  Apr. 17, 2014

(51) Int. Cl.
*H04L 12/26* (2006.01)

(52) U.S. Cl.
CPC ............. *H04L 43/04* (2013.01); *H04L 43/045* (2013.01); *H04L 43/106* (2013.01)

(58) Field of Classification Search
CPC ...... H04L 67/2842; H04L 69/16; H04L 67/02; H04L 63/0272; H04L 63/105; H04L 63/166; H04L 67/06; H04L 67/14; H04L 67/34; H04L 69/10; H04L 69/165; H04L 29/125; H04L 29/12509; H04L 41/0654; H04L 41/0631; H04L 43/04; H04L 43/045; H04L 43/106
See application file for complete search history.

(56) References Cited

U.S. PATENT DOCUMENTS

| | | | | |
|---|---|---|---|---|
| 5,027,269 A * | 6/1991 | Grant | .................... | G06F 11/142 709/224 |
| 6,628,671 B1 * | 9/2003 | Dynarski | ............ | H04L 12/2856 370/389 |
| 7,188,170 B1 * | 3/2007 | Burnley | .............. | G06F 11/3419 702/186 |
| 7,353,229 B2 * | 4/2008 | Vilcauskas, Jr. | ........ | G06Q 10/06 705/14.51 |
| 8,762,516 B2 * | 6/2014 | Kilcoyne | ............ | G06F 11/3438 709/200 |
| 8,914,494 B2 * | 12/2014 | Bunch | ................... | H04L 43/045 709/224 |
| 2002/0019834 A1 * | 2/2002 | Vilcauskas, Jr. | ........ | G06Q 10/06 715/202 |
| 2004/0073536 A1 * | 4/2004 | Smith-Semedo | ......... | G06F 1/14 |
| 2005/0097506 A1 * | 5/2005 | Heumesser | .............. | G07C 1/10 717/102 |
| 2008/0250109 A1 * | 10/2008 | Jakobson | ............. | G06Q 10/107 709/206 |
| 2009/0279440 A1 * | 11/2009 | Wong | .................. | H04L 41/0631 370/242 |
| 2010/0049614 A1 * | 2/2010 | Vilcauskas, Jr. | ... | G06Q 30/0277 705/14.73 |

(Continued)

*Primary Examiner* — Sargon Nano
(74) *Attorney, Agent, or Firm* — Perkins Coie LLP

(57) ABSTRACT

Methods and systems for tracking time in a web-based environment are described. In some embodiments, a web-based application to track time associated with a plurality of records is provided. A record in an active state is identified. A session associated with the record is generated, which includes activating a timer. An indication is received indicating that the record is in an inactive state. In response to receiving the indication, the session is ended, which includes deactivating the timer. A duration of the session is recorded.

17 Claims, 10 Drawing Sheets

(56) References Cited

U.S. PATENT DOCUMENTS

| | | | | |
|---|---|---|---|---|
| 2010/0099443 A1* | 4/2010 | King | ............... | H04W 4/12 |
| | | | | 455/466 |
| 2010/0107088 A1* | 4/2010 | Hunt | ............... | G06Q 10/10 |
| | | | | 715/752 |
| 2011/0288962 A1* | 11/2011 | Rankin, Jr | ............... | G06F 17/30525 |
| | | | | 705/27.1 |
| 2011/0289010 A1* | 11/2011 | Rankin, Jr. | ............... | G06Q 50/16 |
| | | | | 705/313 |
| 2011/0289106 A1* | 11/2011 | Rankin, Jr. | ............... | G06Q 10/10 |
| | | | | 707/769 |
| 2011/0289161 A1* | 11/2011 | Rankin, Jr. | ............... | G06Q 10/107 |
| | | | | 709/206 |
| 2012/0069131 A1* | 3/2012 | Abelow | ............... | G06Q 10/067 |
| | | | | 348/14.01 |
| 2012/0131365 A1* | 5/2012 | Tabone | ............... | G06F 1/3203 |
| | | | | 713/320 |
| 2013/0024759 A1* | 1/2013 | Yuan | ............... | G06F 17/30902 |
| | | | | 715/205 |

* cited by examiner

METHODS AND SYSTEMS FOR TRACKING TIME IN A WEB-BASED ENVIRONMENT

TECHNICAL FIELD

Various embodiments of the present invention generally relate to tracking time. More specifically, various embodiments of the present application relate unique session time tracking in web-based environments.

BACKGROUND

Tracking employee time accurately and efficiently is a challenge that many companies face. Accurate time recording is necessary for many reasons. For example, clients may be billed directly for the time that is recorded on matters, and employees' or process inefficiencies may be detected. In some circumstances, employees work on multiple matters per day, sometimes switching between matters multiple times per hour. Some jobs require an employee to record time spent on each matter. The recordation process may be manual, which can be a burden to employees. For example, the employee may be required to insert a matter number, time spent on the matter, and a description into a time tracking application. It may be difficult for the employee to remember or calculate the time spent on a matter, especially when working on multiple matters.

SUMMARY

In one embodiment, a method of tracking time includes providing a web-based application to track time associated with a plurality of records; identifying a record in an active state; generating a session associated with the record in the active state, where generating a session associated with the active record includes activating a timer; receiving an indication that the record is in an inactive state; in response to receiving the indication that the record is in the inactive state, ending the session, where ending the session includes deactivating the timer; and recording a duration for the session associated with the record.

The web-based application may be hosted in a cloud-computing environment. Each record in the plurality of records may be defined by separate tabs in a multi-tabbed web-browser. In some embodiments, each of the plurality of records is defined by sub-tabs within a single tab in a multi-tabbed web-browser. In some embodiments, receiving an indication that the record is in the inactive state includes identifying that a second record is in an active state.

The method of tracking time may additionally include calculating a total duration of the record, where the total duration is based on the duration of each session associated with the record; and recording the total duration for the record. In further embodiments, the method may include continuously updating the duration of the record for the session associated with the record; and continuously updating the total duration of the record. The method of tracking time may further include displaying the continuously updated total duration of the record in substantially real time; and displaying the continuously updated duration of the record for the session in substantially real time.

The method of tracking time may include detecting that a predetermined total duration of the record has been exceeded; and providing an indication to a user of the web-based application that the predetermined total duration for the record has been exceeded, where the indication includes changing a color of an indicator. The method of tracking time may further include receiving a deactivation selection of the timer during the session associated with the record in the active state; in response to receiving the deactivation selection, deactivating the timer; receiving a reactivation selection during the session associated with the record in the active state; and in response to receiving the reactivation selection, reactivating the timer.

In another embodiment, a method of tracking time includes providing a web-based application to track time associated with a plurality of records; receiving a selection of a first record; in response to receiving the selection of the first record, generating a first session associated with the first record, where generating the first session associated with the first record includes activating a timer associated with the first session of the first record; and detecting a selection of a second record; in response to detecting the selection of the second record, ending the first session associated with the first record, where ending the first session associated with the first record includes deactivating the timer associated with the first session of the first record; and recording a duration of the first session associated with the first record.

In response to detecting the selection of the second record, the method may further include the step of generating a first session associated with a second record. The web-based application may be hosted in a cloud-computing environment. Each record in the plurality of records may be defined by separate tabs in a multi-tabbed web-browser. Each of the plurality of records may be defined by sub-tabs within a single tab in a multi-tabbed web-browser.

The method of tracking time may include calculating a total duration of the first record, where the total duration is based on the duration of each session associated with the first record; and recording the total duration for the first record. The method may further include continuously updating the duration of the first session of the first record; continuously updating the total duration of the first record; displaying the continuously updated total duration of the first session of the first record in substantially real time; displaying the continuously updated duration of the first session of the first record in substantially real time; detecting that a predetermined total duration of the record has been exceeded; and providing an indication to a user of the web-based application that the predetermined total duration for the record has been exceeded, where the indication includes changing a color of an indicator.

In some embodiments, the method of tracking time further includes receiving a deactivation selection of the timer during the first session associated with the first record in the active state; in response to receiving the deactivation selection, deactivating the timer; receiving a reactivation selection during the first session associated with the first record in the active state; and in response to receiving the reactivation selection, reactivating the timer.

In another embodiment, a non-transitory machine-readable medium having machine executable instructions stored thereon that, when executed by one or more processors, direct the one or more processors to perform a method that includes providing a web-based application to track time associated with a plurality of records, where the web-based application is hosted in a cloud-computing environment, where each of the plurality of records is defined by sub-tabs within a single tab in a multi-tabbed web-browser; identifying a record in an active state; generating a session associated with the record in the active state, where generating a session associated with the active record includes activating a timer; receiving an indication that the record is in an inactive state, where receiving an indication that the record is in the inactive state includes identifying that a second record is in an active state; in response to receiving the indication that the record is in the inactive state, ending the session, where ending the session includes deactivating the timer; continuously updating the duration of the record for the session associated with the record; continuously updating the total duration of the record; calculating a total duration of the record, where the total duration is based on the duration of each session associated with the record; displaying the continuously updated total duration of the record in substantially real time; displaying the continuously updated duration of the record for the session in substantially real time; detecting that a predetermined total duration of the record has been exceeded; providing an indication to a user of the web-based application that the predetermined total duration for the record has been exceeded, where the indication includes changing a color of an indicator; receiving a deactivation selection of the timer during the session associated with the record in the active state; in response to receiving the deactivation selection, deactivating the timer; receiving a reactivation selection during the session associated with the record in the active state; in response to receiving the reactivation selection, reactivating the timer; recording the total duration for the record; and recording a duration for the session.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
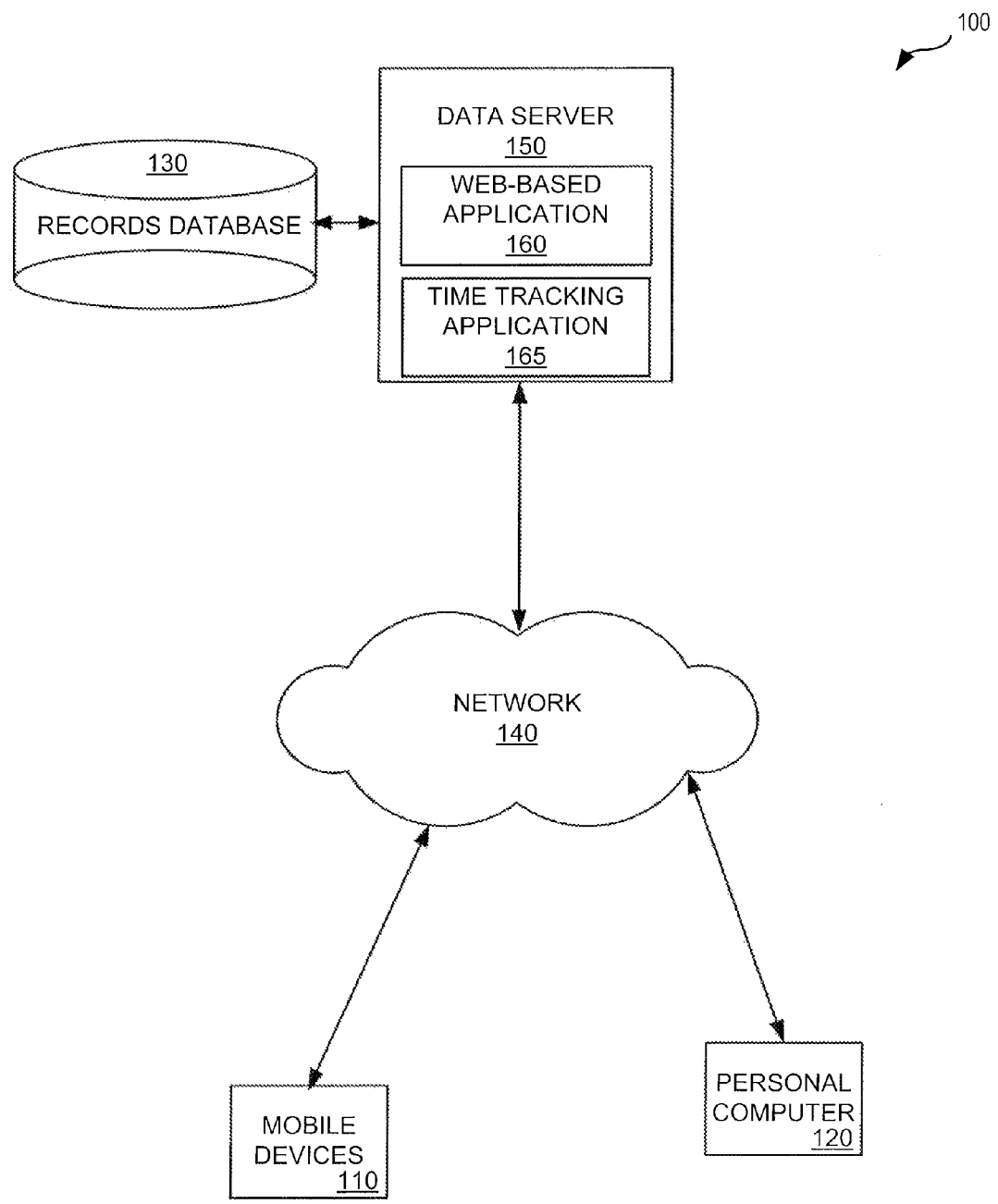
FIG. 1 illustrates an example of an operating environment in which some embodiments of the present invention may be utilized.

The figures have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the figures and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to tracking time. More specifically, various embodiments of the present application relate unique session time tracking in web-based environments.

Embodiments of the present invention allow for automatic time tracking while a user is working on various matters or activities using a time tracking application. The matters will be referred to herein as a record. For purposes of this application, a record is a uniquely identifiable set of data fields that describe a support case, sales lead, or any other logical entity. For example, a record may include information associated with a customer, such as contact information, sales data, products bought and sold, and banking information. The disclosure discusses time tracking specifically for records; however, those skilled in the art will understand that the disclosure is not limited to tracking time for records. The time tracking application tracks and records time for records and activities that take place within a web-based environment. In some embodiments, the time tracking application uses tabbing features within the web-based environment to detect which record time should be recorded for. Each record may be associated with a different tab. For example, the user may open several records, each in a separate tab, and time will automatically be recorded for the record that is currently displayed, which is referred to herein as the "active record." Although multiple records may be open at one time, only one record is active at a time. Once the time tracking application detects that a record is active, time is automatically recorded for that record. When the user switches records to work on a different record, the time tracking application detects this change and stops recording time for the first record, which is now inactive, and begins recording time for the active record. The time tracking application may be configured to display the timing information related to a record in real time as the timing information is updated. The time tracking application may also calculate and display aggregated information for the record, allowing the user to view the total amount of time spent on a particular record. This information may be collected for each record, organized by sessions, and/or by type of session.

Users of the time tracking application may include employees working on a record, managers supervising records or employees, customers, and accountants. Embodiments of the present invention may be useful for billing and accounting purposes, auditing, and removing a burden from employees. Generally, time is tracked on a per-user basis, but embodiments of the present invention contemplate displaying and/or calculating more than one user's time in combination. For example, tracking and combining multiple users' time on a user interface may be useful if there is a total budget for a project or task associated with a record.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

FIG. 1 illustrates an example of an operating environment 100 in which some embodiments of the present invention may be utilized. Embodiments of the present invention illustrated in FIG. 1 allow user interactions through various points of interaction such as, but not limited to, mobile devices 110 and personal computer 120. These points of interaction can include mechanisms for exchanging information through network 140 with data server 150. Mobile devices 110 and personal computer 120 may run one or more applications or clients that allow a user to interact with the network 140. Network 140 communicably couples mobile devices 110 and personal computer 120 to data server 150 running various applications.

Data server 150 interacts with records database 130. As shown in FIG. 1, data server 150 includes a web-based application 160 and a time tracking application 165. Records database 130 may include one or more records used by an entity. Records database 130 may include any type of information associated with a record such as contact information, marketing information, sales information, and information related to timing that is tracked by time tracking application 165.

Mobile devices 110 may be cellular phones, smart phones (a smart phone being a cellular phone that has capabilities and features such as, but not limited to, internet access, a full keyboard, email access, Wi-Fi connection capabilities, BLUETOOTH connectivity, or any other functionality of a computer), tablet computers (a portable computer having a touch interface), netbooks, laptops possibly with a wireless connection (such as an 802.11a/b/g connection or mobile broadband connection, such as via a 3G or 4G wireless network). Personal computer 120 may be any computer (e.g., desktop computers, laptop computers, netbooks, tablet computers, Internet-enabled television devices, etc.) connected to network 140.

Web-based application 160 may be a web-based application that a user accesses on a personal computer 120 or other device by launching a web browser and optionally (typically) logging in. Web-based application may be a CRM system such as Salesforce. Time tracking application 170 is an application that operates in connection with web-based application 160 to track the time a user spends on records and activities within the web-based environment. Time tracking application 165 may be integrated into web-based application 160.

Figure 2:
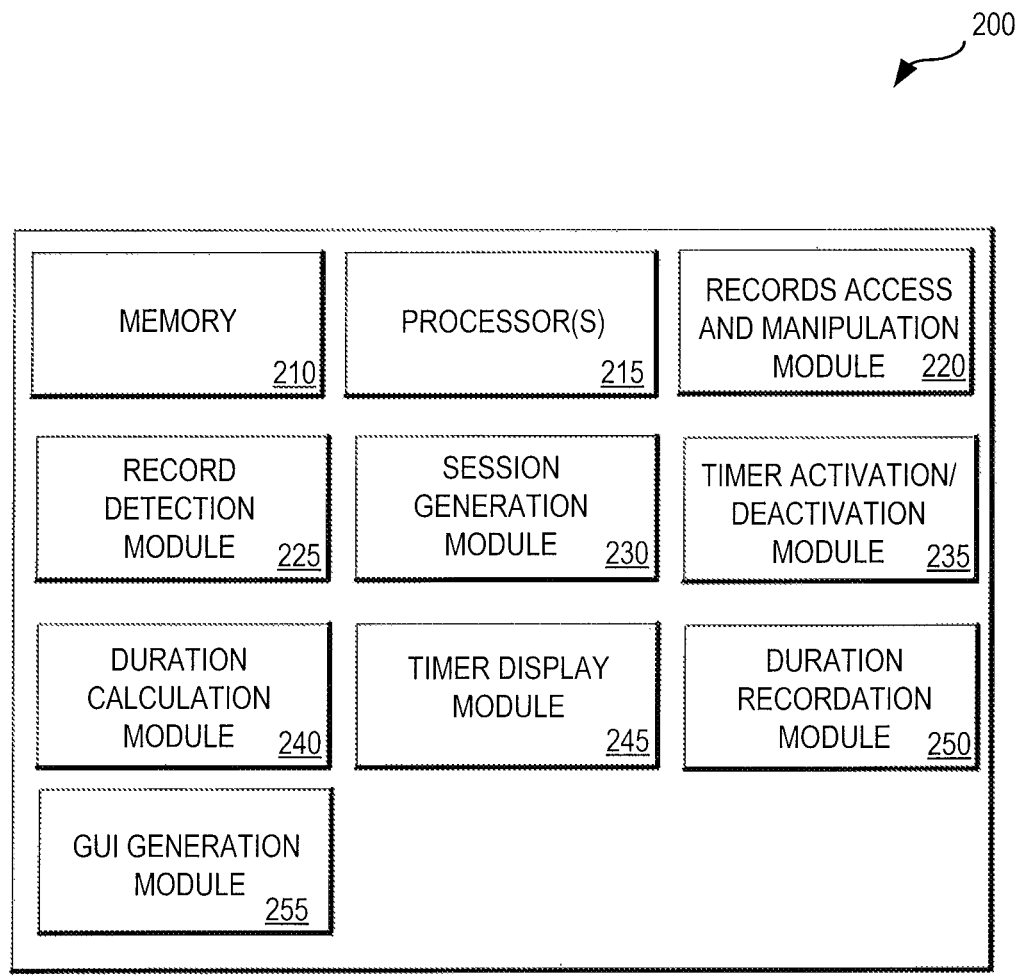
FIG. 2 is a block diagram illustrating components that can be included in a timer tracker in accordance with various embodiments of the present invention.

FIG. 2 is a block diagram illustrating components that can be included in a system that tracks time in accordance with various embodiments of the present invention. The components in FIG. 2 may be implemented in a system such as system 100. According to the embodiments shown in FIG. 2, the time tracking system 200 may include memory 210, one or more processors 215, record access and manipulation module 220, record detection module 225, session generation module 230, timer activation/deactivation module 235, duration calculation module 240, timer display module 245, duration recordation module 250, and GUI generation module 255. Other embodiments of the present invention may include some, all, or none of these modules and components along with other modules, applications, and/or components. Still yet, some embodiments may incorporate two or more of these modules into a single module and/or associate a portion of the functionality of one or more of these modules with a different module.

For example, in one embodiment, the functionality associated with record detection module 225 and session generation module 230 can be incorporated into a single session module. As another example, in one embodiment, the timer activation/deactivation module 235 can be separated into a timer activation module and a timer deactivation module to activate and deactivate the timer.

Memory 210 can be any device, mechanism, or populated data structure used for storing information. In accordance with some embodiments of the present invention, memory 210 can encompass any type of, but is not limited to, volatile memory, nonvolatile memory, and dynamic memory. For example, memory 210 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 210 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 210.

Memory 210 may be used to store instructions for running one or more applications or modules on processor(s) 215. For example, memory 210 could be used in one or more embodiments to house all or some of the instructions needed to execute the functionality of records access and manipulation module 220, record detection module 225, session generation module 230, timer activation/deactivation module 235, duration calculation module 240, timer display module 245, duration recordation module 250, and GUI generation module 255.

Figure 5:
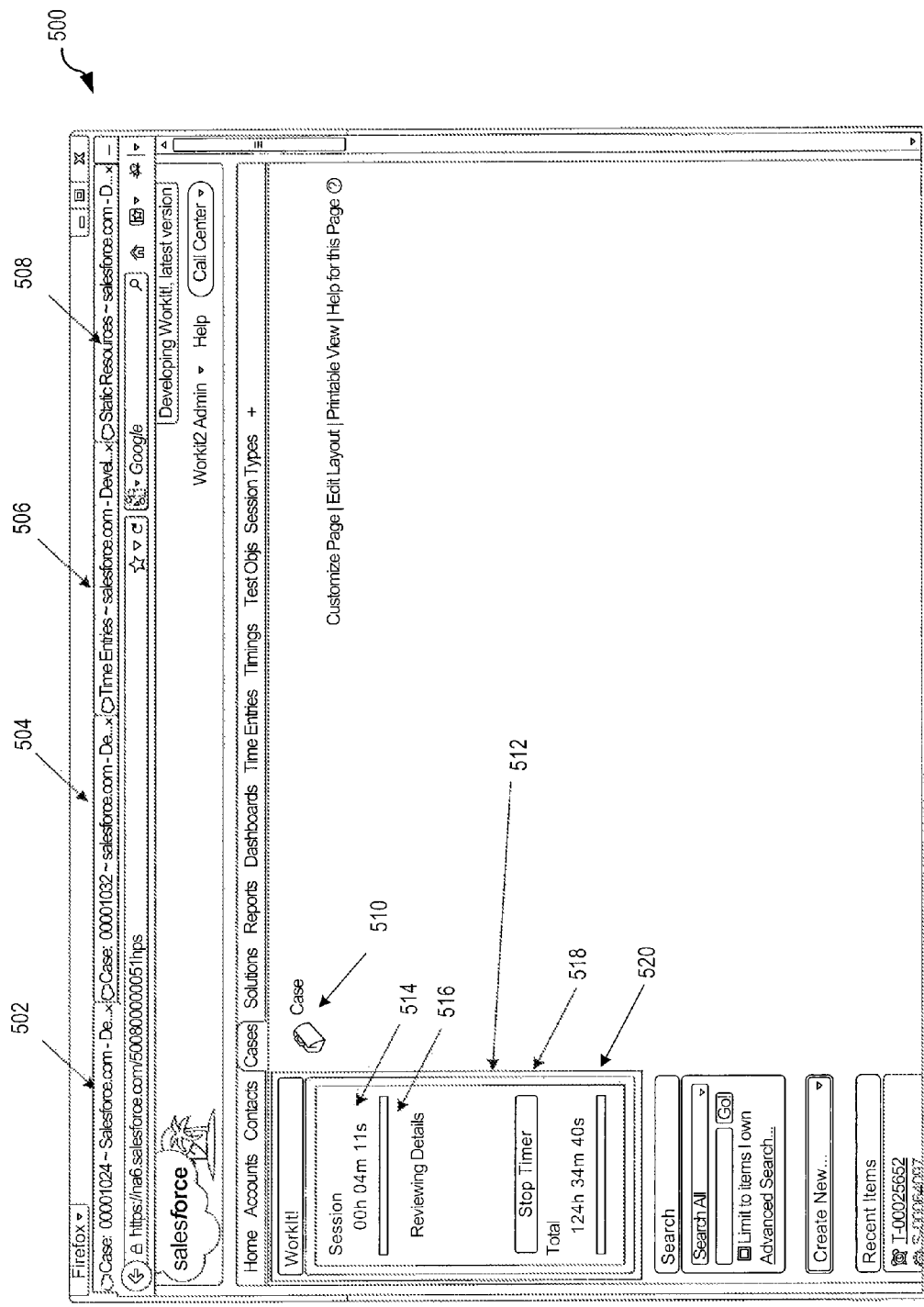
FIG. 5 is an example of a screen layout.

Records access and manipulation module 220 is configured to allow a user to access one or more records from a database such as records database 130. Records access and manipulation module 220 is further configured to allow a user to manipulate a record such as by adding content to the record, sending emails in connection with a record, etc. A user may open a record, causing a record to appear in a tab by any method known in the art, such as by searching in the web-based application, or selecting a record from a queue associated with the user. The records access and manipulation module 220 may allow a user to access and manipulate various records using a multi-tabbed browser. A multi-tabbed browser includes all common desktop and mobile web browsers, such as but not limited to, Internet Explorer, Firefox, Safari, and Chrome. An example of a multi-tabbed browser layout is shown in FIG. 5. Multi-tabbed browser 500 is a web-browser supporting multiple tabs, such as tabs 502, 504, 506, and 508. Each record may be associated with, or defined by, a separate tab in a multi-tabbed browser and the record can be accessed by selecting a browser tab associated with the record. FIG. 5 is only one example; other layouts and additional browser tabs are contemplated.

Figure 6:
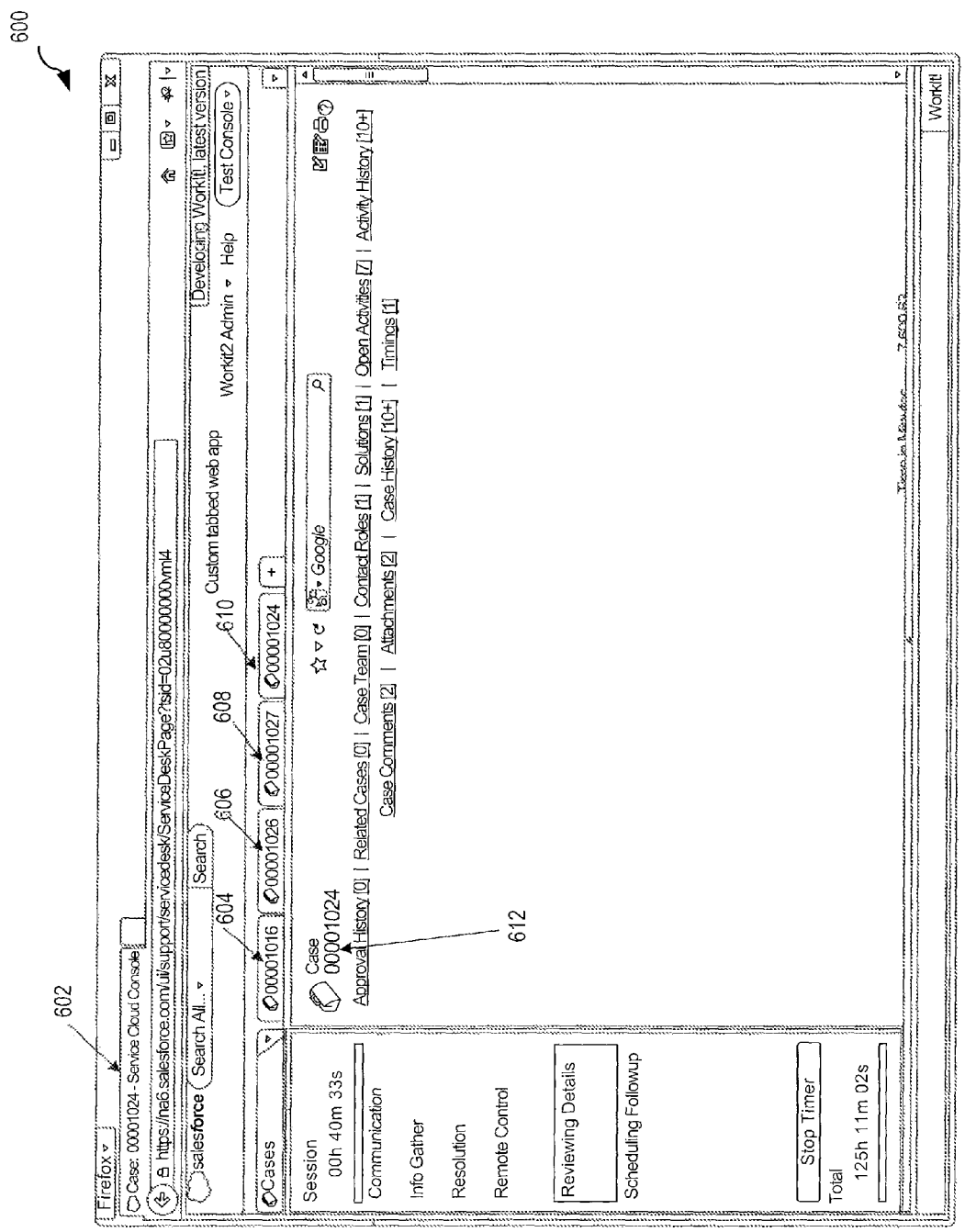
FIG. 6 is an example of a screen layout.

In another embodiment, records access and manipulation module 220 allows a user to access and manipulate various records using a custom multi-tabbed web application. An example of a custom multi-tabbed web application is a web application that is opened in a single browser tab but imitates a multi-tabbed functionality using custom logic/components. An example of such a custom multi-tabbed web application layout is shown in FIG. 6. Standard multi-tabbed browser 600 includes a standard single browser tab 602, and custom sub-tabs 604, 606, 608, and 610. Sub-tabs 604, 606, 608, and 610 are sub-tabs within the single browser tab 602. In this example, the records are accessed by selecting one of the sub-tabs 604, 606, 608, and 610. In this example, each of the records is defined by sub-tabs within a single tab in a multi-tabbed web browser. In both embodiments, records access and manipulation module 220 interfaces with modules that are configured to provide time tracking services to track time related to the records accessed and manipulated by records access and manipulation module 220. FIG. 6 is one example of a custom multi-tab layout. Numerous tabs and sub-tabs are contemplated.

Record detection module 225 is configured to detect when a record is active and inactive. The active record is the record currently appearing in a user's view, which is the record associated with the selected tab (such as in FIG. 5) or sub-tab (such as in FIG. 6). Thus, the active record may be detected by identifying which tab or sub-tab is selected. For example, in FIG. 5, the active record is record 510, which is associated with the active tab 502. In this example, tab 502 is the active tab because the record 510 associated with tab 502 is currently being displayed. Any record that is not active is inactive. Thus, any tab that is not active is inactive. Examples of inactive tabs include tabs 504, 506, and 508. FIG. 6 includes additional embodiments. The active record in FIG. 6 is record 612, which is associated with and displayed by sub-tab 610. Inactive sub-tabs in FIG. 6 include 604, 606, and 608. Thus, although several records may be open at one time, only one tab or sub-tab is "active." In some embodiments, a user accesses records using the records access and manipulation module 220.

Figure 7A:
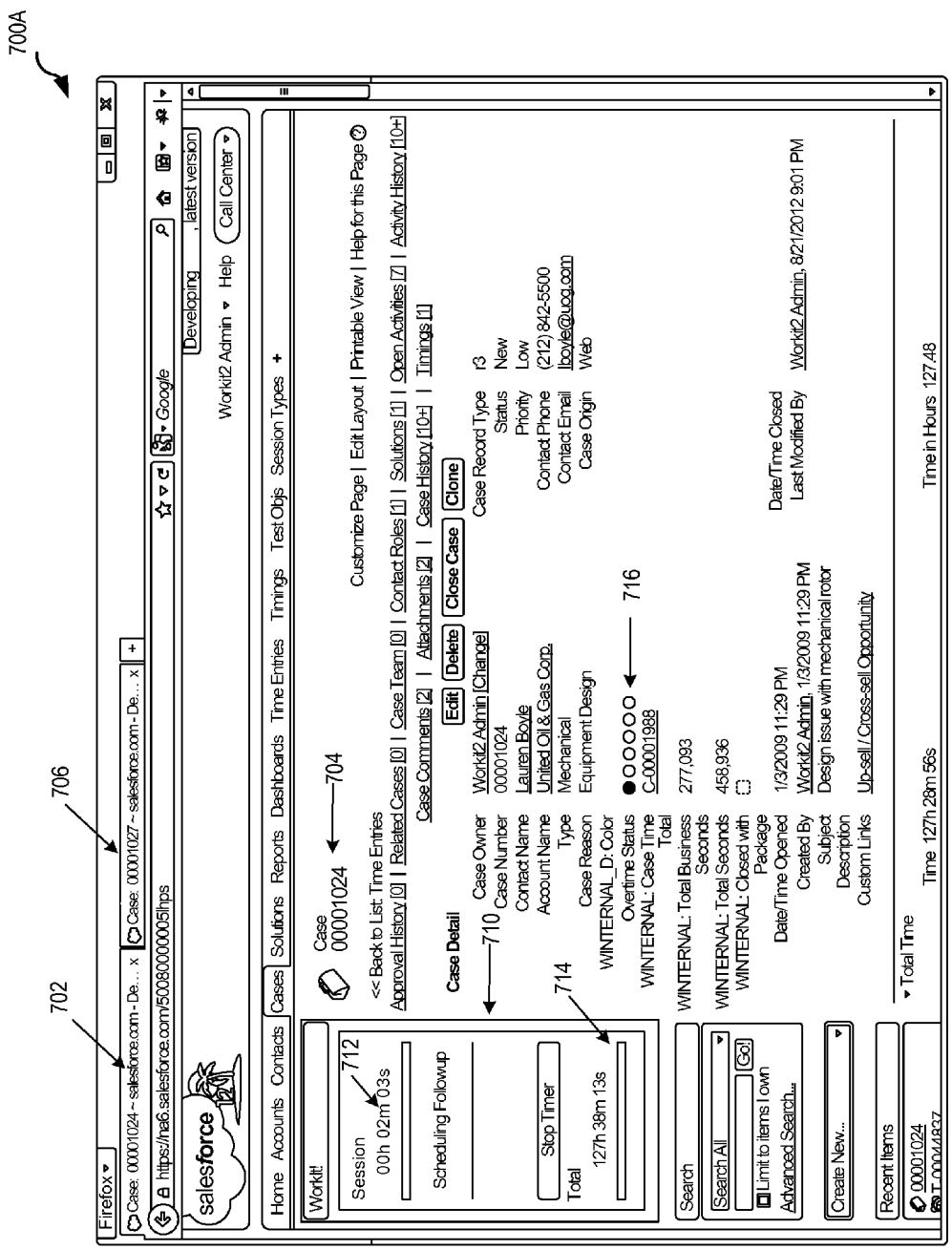
FIG. 7A is an example of a screen layout.
Figure 7B:
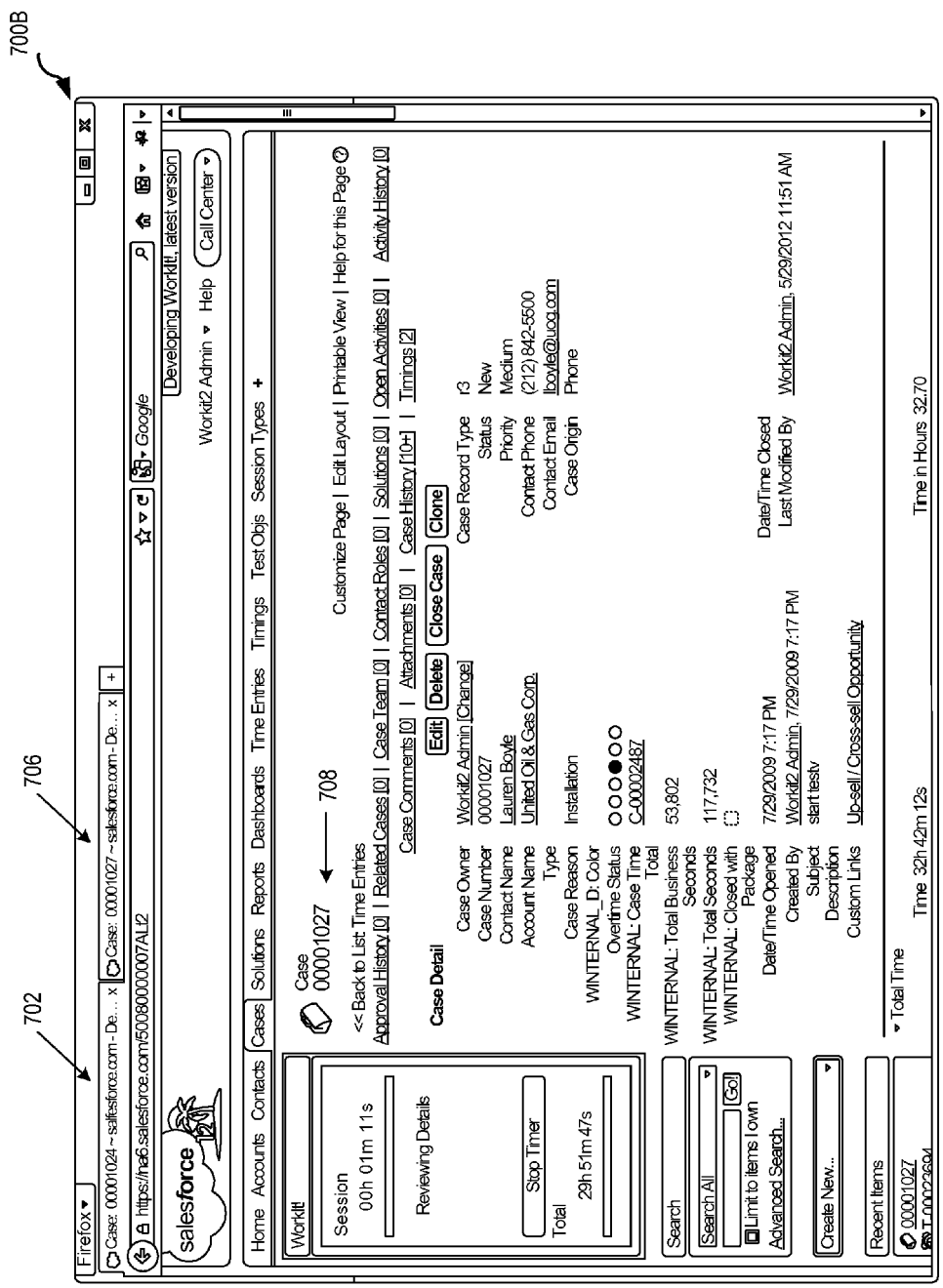
FIG. 7B is an example of a screen layout.

The record detection module 225 may be further configured to detect when an active record becomes inactive. A record in an active state may become a record in an inactive state when a different tab is selected. In an example, FIG. 7A includes tab 702, tab 706, and active record 704. Tab 702 is active and tab 706 is inactive. The active record is associated with the active tab 702. FIG. 7B shows the same tabs, but tab 706 is the selected tab. Thus, tab 706 is the active tab and tab 702 is the inactive tab in FIG. 7B. Tab 706 is displaying the active record 708. The tabs or sub-tabs may be labeled with identifiers of the record number. This may help with identification of the record.

Session generation module 230 is configured to begin a session for a record. A session is an activity or set of activities during one active session associated with the record. A session for a record initially begins when the record detection module 225 identifies or detects that a record is active. In some embodiments, a session ends when the record detection module 225 detects that the record is inactive or when a separate activity in the same record is detected. In an example, in FIG. 7B, a session for record 708 begins when tab 706 is selected, displaying active record 708. Session generation module 230 interfaces with timer activation/deactivation module 235 such that time is recorded for each session associated with a record. The user has the ability to stop the session while the record is active and reactivate the session, so the duration of a session may or may not be the entire duration that the record is active. For example, if the user wishes to remain working in the active record during a session but needs to accomplish an unrelated task such as take a restroom break, the user may provide an indication to stop the timer. For example FIG. 7A, has a "stop timer" button 710. Pressing this button will stop a timer during the session. The active tab will remain active, but no time will be recorded during the restroom break. The user can restart the timer for the record during the session by clicking within the active record. In some embodiments, the timer may be reactivated by clicking anywhere in the active record. Alternatively, in some embodiments, the timer may be reactivated by the user clicking in a certain area in the active record, such as by clicking on a "start timer" button. In some embodiments, after the user has pressed the "stop timer" button and the timer has stopped, the "stop timer" button is automatically replaced with a "start timer" button. In this example, the timer restarts when the user presses the "start timer" button. In some embodiments, a session may be further defined by tasks associated with the active record. The session type may be automatically identified based on the activity happening in the record, thus starting and stopping the timer based on the activity and the record. A session type may include, for example, "reviewing details" or "scheduling follow-up."

Timer activation/deactivation module 235 is configured to activate and deactivate a timer associated with the session for the active record. The timer activation/deactivation module 235 may automatically activate a timer for the active record when the session for the record begins. The timer activation/deactivation module 235 may deactivate the timer when a session is detected as inactive or when the user stops the timer manually during a session, or when a new type of session for the record is detected, as described above. The timer may be activated when the user begins working in the record.

Duration calculation module 240 is configured to calculate various durations associated with a record. For example, duration calculation module 240 may calculate a total duration time for the records based on the session times. In an example, the duration calculation module may add up the session times associated with a record to determine a total record duration. Duration calculation module 240 may be further configured to add up session times associated with a certain task for a record to determine the total duration of a certain activity associated with a record, or the duration of a type of task may be combined across all records to determine a total amount of time performing a certain activity. Duration calculation module 240 may continuously update a session duration associated with a record, and a total duration for the record. Duration calculation module 240 may communicate the duration data to timer display module 245.

Timer display module 245 is configured to receive timing data from duration calculation module 240 and display the timing data associated with the record. The timing data may be displayed when a record is active. For example, in FIG. 5, session timing data 514 of the active record 510 is displayed. The total duration 520 of time spent on a record may be displayed. The duration of the session and the total duration of the record may be continuously updated on the display. In some embodiments a colored session timing bar 516 may provide a visual display indicating whether the timer is activated or inactivated. The color bar may alternatively indicate remaining time associated with a certain activity, record, or session by indicating a status with the color of the bar. For example, if the bar is red, it may indicate that a predetermined time limit has been exceeded. In some embodiments, predetermined timing information may be associated with a record. Once the allotted time has been exceeded, an alert or indication may be provided to the user. For example, a status bar on the current record may turn a different color, such as status bar 712, 714, or 716 in FIG. 7A. For example, one or more dots associated with element 716 may be filled in with various colors indicating the amount of time spent on the record.

Figure 8A:
FIG. 8A is an example of a screen layout.
Figure 8B:
FIG. 8B is an example of a screen layout.
Figure 8C:
FIG. 8C is an example of a screen layout.

Timing data may also be displayed in summary reports. FIGS. 8A, 8B, and 8C are examples of summary timing details for a record. The summary details may include a time entry number associated with the time entry 802, the record number 804, session type 806, start time 808, end time 810, duration 812, and business time 814. In some embodiments, the time of day during which time was recorded may be calculated and summarized in a report. For example, business time 814 is a subset of the total time that occurred during the company's business hours. "Business hours" may be predefined with multiple settings if the company has employees or contractors in different continents for example. The summary report may be editable. This may be helpful if the user continued to record time while taking a break, for example. The summary view may further display information broken out by session type indicating when a session was started and ended, and activity was being performed during the session. Two sessions associated with the same record may be on one summary list. For example, in FIG. 8C, the user began and ended a session associated with record 1024 (element 816), began and ended a session with record 1027 (element 818) and began a new session with record 1024 by reactivating the tab (element 820).

Duration recordation module 250 is configured to store the timing data associated with each record, such as in records database 130.

GUI generation module 255 can generate one or more user interface screens designed to receive user inputs, display records, and/or process other requests from the user. Several example GUIs are shown in FIGS. 5-8C. In one example, a GUI may include a portion devoted to a time tracking display 512, tabs 502-508, an area devoted to the record information, and a portion with various menu items such as Home, Accounts, Contacts, Solutions, Reports, etc.

Figure 3:
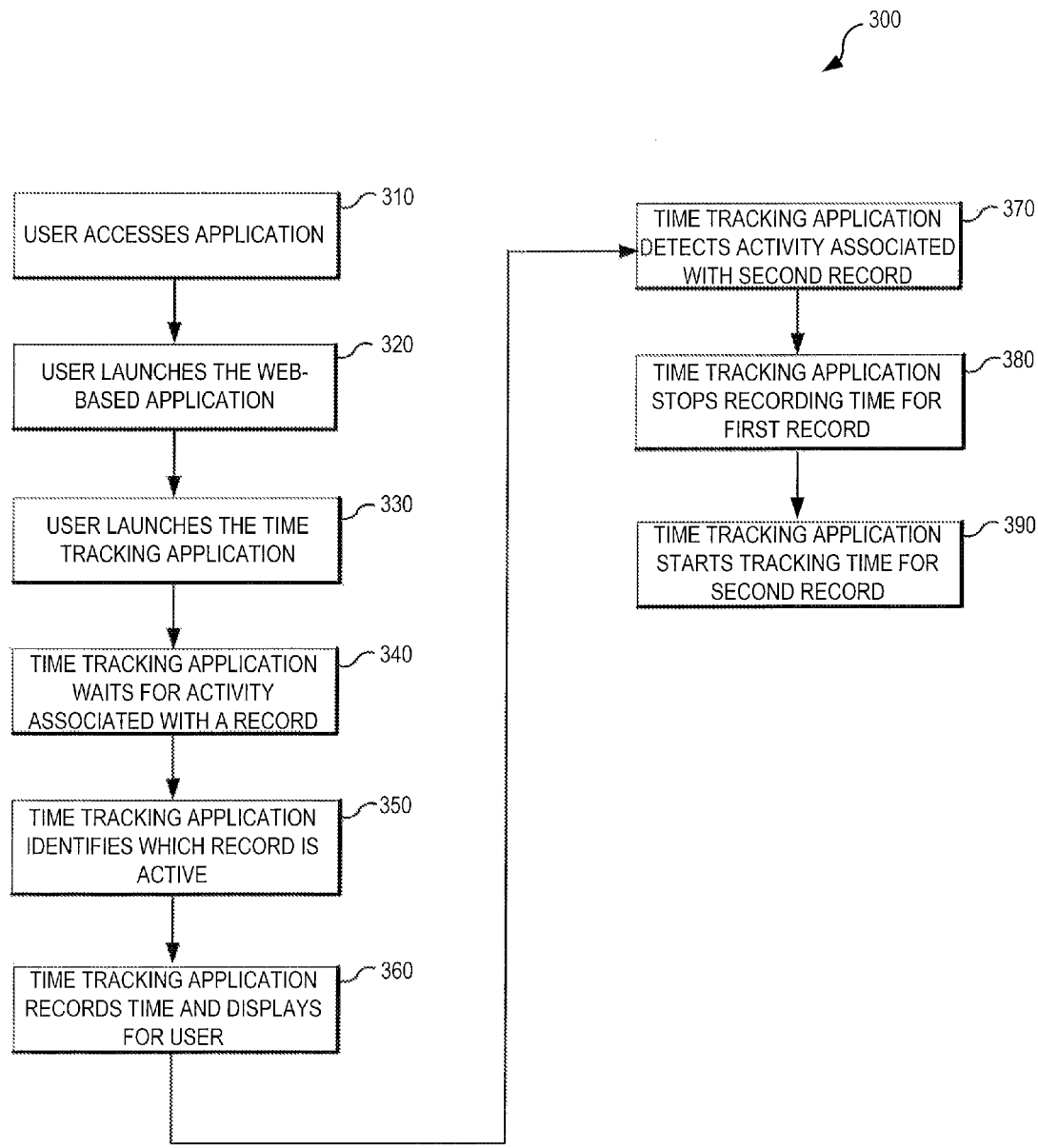
FIG. 3 is a flow chart illustrating a set of operations for tracking time.

FIG. 3 is a flow chart illustrating a set of steps/operations 300 for tracking time. The steps in FIG. 3 may be performed by one or more of the components described with respect to FIG. 2. The steps may be performed in any order. Various embodiments may not include all of the steps described. Furthermore, the operations in FIG. 3 may include steps/operations from other embodiments.

In step 310, a user accesses the web-based application and the time tracking application using a user device such as personal computer 120 or mobile devices 110. The user then launches the web-based application to access various records in step 320. In step 330, the user launches the time tracking application. In some embodiments, the time tracking application may be included with the web-based application. The time tracking application waits for activity associated with a record in step 340. When the time tracking application senses activity associated with a record, step 350, the time tracking application starts a session and begins recording time for the record that is identified, step 360. The time tracking application identifies when there is activity associated with a second record, step 370. The time tracking application then stops recording time associated with the first application in step 380, and begins recording time for a session associated with the second record in step 390.

Figure 4:
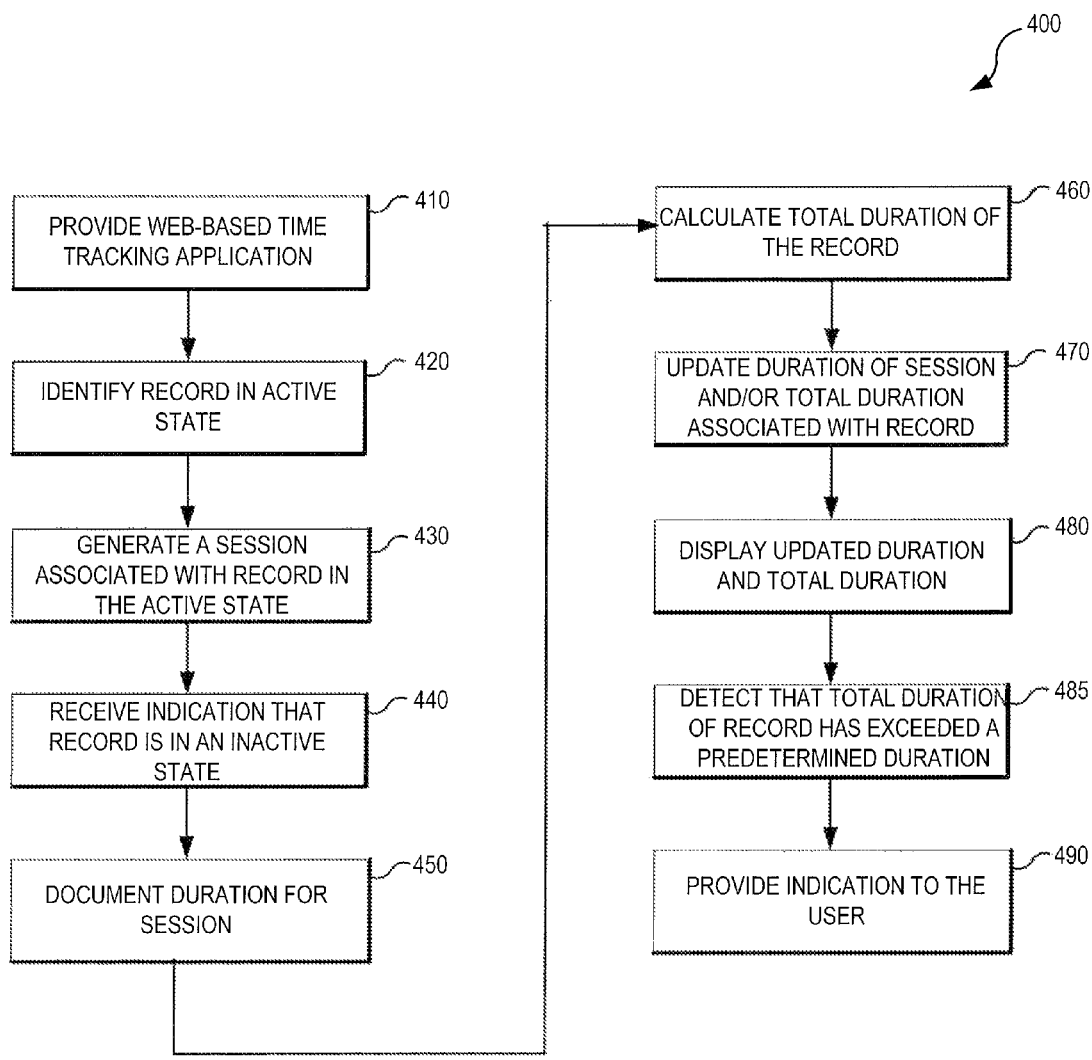
FIG. 4 is a flow chart illustrating a set of operations for tracking time.

FIG. 4 is a flow chart illustrating a set of steps/operations 400 for tracking time. The operations in FIG. 4 may be performed by one or more of the components described with respect to FIG. 2. The operations may be performed in any order. Various embodiments may not include one or more of the operations. Furthermore, the operations in FIG. 4 may include steps/operations from other embodiments.

Time tracking application providing operation 410 provides a web-based time-tracking application that tracks time associated with a plurality of records. The web-based time-tracking application may be integrated with a parent application and provide time tracking for records associated with the parent application. The application may be hosted in a cloud computing environment. Each record may be defined by separate tabs in a multi-tabbed web browser, or each record may be defined by sub-tabs within a single tab in a multi-tabbed web browser. Active record identification operation 420 identifies the record that is in an active state. In some embodiments, the record that is in an active state is the record that is in the current display. Session generation operation 430 generates a session associated with the record in the active state. Inactive record identification operation 440 receives an indication that the active record is now in an inactive state. Identifying that the active record is in an inactive state may include identifying that a second record is in an active state. Duration documentation operation 450 records a duration for the session associated with the record.

Duration calculation operation 460 calculates the total duration of the record. The total duration for the record may be based on the time spent during all of the sessions. A total duration may be recorded for the record. Duration updating operation 470 continuously updates the duration of a session associated with a record and/or the total duration associated with a record. Duration display operation 480 displays the updated duration and total duration information. This information may be displayed with a current record or as summary data. Duration limit operation 485 detects that a total duration associated with the record has exceeded a predetermined duration associated with the record. Indication operation 490 provides an indication of the overtime status to the user. The indication may include turning an indicator a different color. For example, an indicator may be a status bar or the color or the timer, and the indicator may turn red to alert the user.

FIG. 5-7B. are examples of screen layouts that include a web-based application with time tracking capabilities.

FIG. 8 includes examples of summary time tracking reports displays.

Exemplary Computer System Overview

Figure 9:
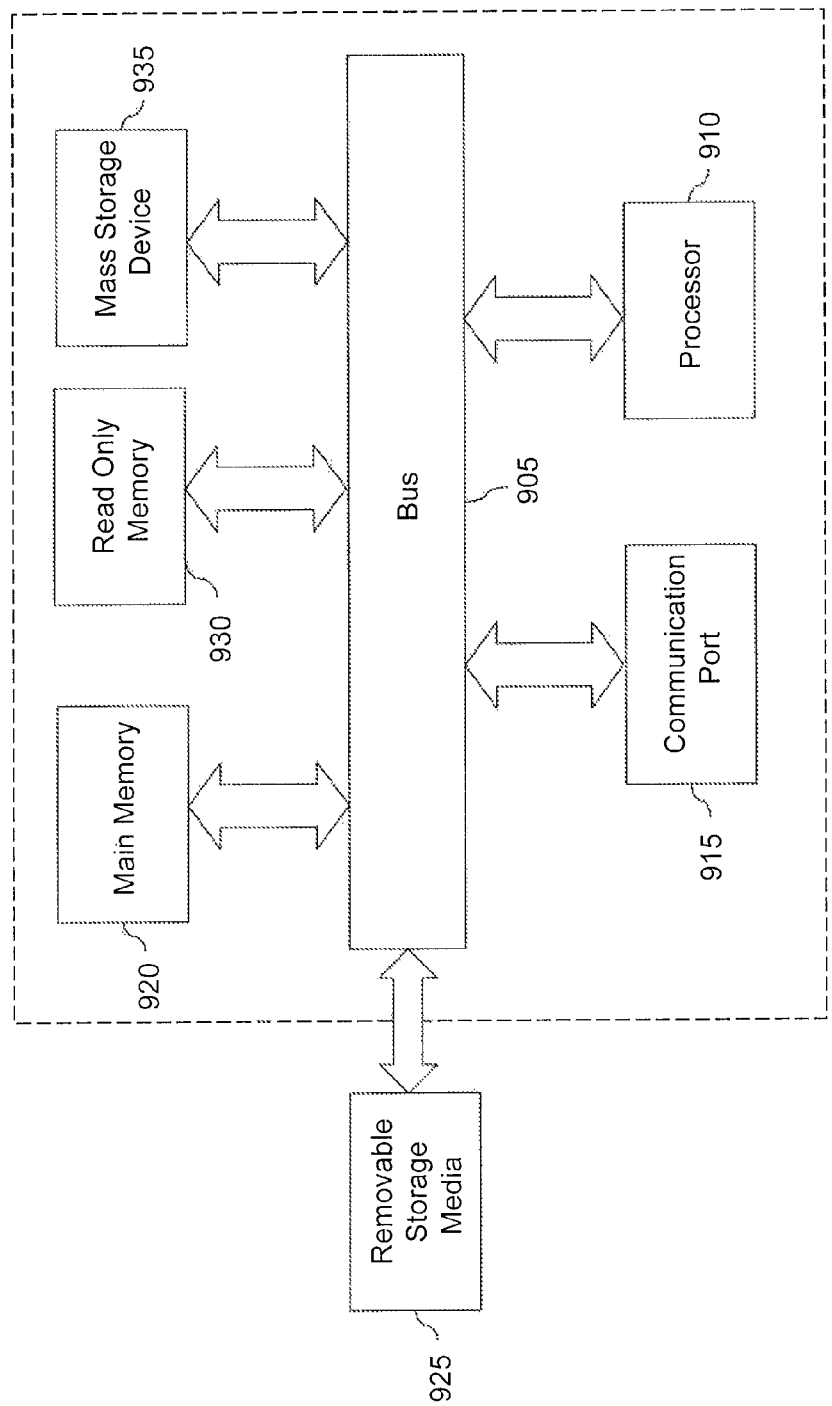
FIG. 9 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 9 is an example of a computer system 900 with which embodiments of the present invention may be utilized. According to the present example, the computer system includes a bus 905, at least one processor 910, at least one communication port 915, a main memory 920, a removable storage media 925, a read only memory 930, and a mass storage 935.

Processor(s) 910 can be any known processor, such as, but not limited to, an Intel® Itanium® or Itanium 2® processor(s), AMD® Opteron®, Athlon MP® processor(s), or Motorola® lines of processors. Communication port(s) 915 can be any of an RS-232 port for use with a modem-based dial-up connection, a 10/100 Ethernet port, or a Gigabit port using copper or fiber. Communication port(s) 915 may be chosen depending on a network such as a Local Area Network (LAN), Wide Area Network (WAN), or any network to which the computer system 900 connects.

Main memory 920 can be Random Access Memory (RAM) or any other dynamic storage device(s) commonly known in the art. Read only memory 930 can be any static storage device(s) such as Programmable Read Only Memory (PROM) chips for storing static information such as instructions for processor 910.

Mass storage 935 can be used to store information and instructions. For example, hard disks such as the Adaptec® family of SCSI drives, an optical disc, an array of disks such as RAID (such as the Adaptec family of RAID drives), or any other mass storage devices may be used.

Bus 905 communicatively couples processor(s) 910 with the other memory, storage, and communication blocks. Bus 905 can be a PCI/PCI-X or SCSI based system bus depending on the storage devices used.

Removable storage media 925 can be any kind of external hard-drives, floppy drives, IOMEGA® Zip Drives, Compact Disc-Read Only Memory (CD-ROM), Compact Disc-Re-Writable (CD-RW), or Digital Video Disk-Read Only Memory (DVD-ROM).

The components described above are meant to exemplify some types of possibilities. In no way should the aforementioned examples limit the scope of the invention, as they are only exemplary embodiments.

TERMINOLOGY

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

As used herein, "substantially in real time" refers to the amount of time a computing device takes to exchange electrical communications and/or process and/or compute data.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to tracking time in a web-based application, embodiments of the present invention are equally applicable to various other applications.

Also, for the sake of illustration, various embodiments of the present invention have herein been described in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present invention provides novel systems, methods and arrangements for tracking time in a web-based application. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A method of tracking time comprising:
providing a web-based application hosted in a cloud computing environment, the application executing on one or more processors to track time associated with a plurality of records;
providing a multi-tabbed web-browser that includes the plurality of records, wherein each record in the plurality of records is defined by separate tabs or sub-tabs within the multi-tabbed web-browser;
identifying a record in an active state, wherein the record in the active state is the record on a tab or a sub-tab selected for display on a graphical user interface;
creating a record-specific session associated with the record in the active state, wherein generating the session associated with the record in the active state comprises activating a timer corresponding to the record;
identifying a first session type of the record-specific session based on activity occurring within the tab or the sub-tab;
detecting a change in the activity;
in response to detecting a change in the activity, identifying a second session type and recording a duration of the first session type to determine whether a time limit of the activity has been exceeded;
detecting a change in a display on the graphical user interface such that the tab or the sub-tab is no longer selected for display, wherein the change indicates that the record is in an inactive state;
in response to receiving the indication that the record is in the inactive state, ending the record-specific session, wherein ending the record-specific session comprises deactivating the timer; and
recording a duration of the record-specific session associated with the record, where the duration of the record-specific session includes the duration of the first session type and a duration of the second session type.

2. The method of claim 1, further comprising:
calculating a total duration of the record, wherein the total duration is based on the duration of each record-specific session associated with the record; and
recording the total duration of the record.

3. The method of claim 2, further comprising:
continuously updating the duration of the each record-specific session associated with the record; and
continuously updating the total duration of the record.

4. The method of claim 3, further comprising:
displaying the continuously updated total duration of the record in substantially real time; and
displaying the continuously updated duration of the each record-specific session associated with the record in substantially real time.

5. The method of claim 2, further comprising:
detecting that a predetermined total duration of the record has been exceeded; and
providing an indication to a user of the web-based application that the predetermined total duration of the record has been exceeded, wherein the indication to the user comprises changing a color of an indicator.

6. The method of claim 1, wherein receiving the indication that the record is in the inactive state comprises identifying that a second record is in the active state.

7. The method of claim 1, further comprising:
receiving a deactivation selection of the timer during the record-specific session associated with the record in the active state;
in response to receiving the deactivation selection, deactivating the timer;
receiving a reactivation selection during the record-specific session associated with the record in the active state; and
in response to receiving the reactivation selection, reactivating the timer.

8. The method of claim 1, further comprising:
labeling the tabs or the sub-tabs with identifiers of the record; and
identifying the active record based on the label of the active tab or sub-tab.

9. A non-transitory computer-readable storage medium including a set of instructions that, when executed by one or more processors, cause a machine to:
provide a multi-tabbed web-browser that includes a plurality of records, wherein each record in the plurality of records is defined by separate tabs or sub-tabs within the multi-tabbed web-browser, wherein the multi-tabbed web-browser is hosted in a cloud computing environment;
identify a record in the plurality of records that is in an active state, wherein the record in the active state is the record on the tab or the sub-tab that is selected for display on a graphical user interface;
generate a record-specific session associated with the record in the active state, wherein generating the record-specific session associated with the record in the active state comprises:
activating a timer corresponding to the record,
identifying a first session type of the record-specific session based on activity occurring within the tab or the sub-tab, and
detecting a change in the activity;
in response to detecting a change in the activity, identifying a second session type and recording a duration of the first session type to determine whether a time limit of the activity has been exceeded;
detect a change in a display on the graphical user interface such that the tab or the sub-tab is no longer selected for display, wherein the change indicates that the record is in an inactive state;
in response to detecting that the record is in the inactive state, end the record-specific session, wherein ending the record-specific session comprises deactivating the timer; and
record a duration of the record-specific session associated with the record, wherein the duration of the record-specific session includes the duration of the first session type and a duration of the second session type.

10. The non-transitory computer-readable storage medium of claim 9, wherein the set of instructions, when executed by the one or more processors, further cause the machine to:
calculate a total duration of the record, wherein the total duration is based on the duration of each record-specific session associated with the record; and
record the total duration of the record.

11. The non-transitory computer-readable storage medium of claim 10, wherein the set of instructions, when executed by the one or more processors, further cause the machine to:
- continuously update the duration of the each record-specific session associated with the record;
- display a continuously updated total duration of the record in substantially real time;
- display the continuously updated duration of the each record-specific session associated with the record in substantially real time; and
- continuously update the total duration of the record.

12. The non-transitory computer-readable storage medium of claim 10, wherein the set of instructions, when executed by the one or more processors, further cause the machine to:
- detect that a predetermined total duration of the record has been exceeded; and
- display an indication that the predetermined total duration of the record has been exceeded, wherein the indication comprises changing a color of an indicator.

13. The non-transitory computer-readable storage medium of claim 9, wherein the set of instructions that, when executed by the one or more processors, detect that the record is in the inactive state include instructions that, when executed by the one or more processors, receive an indication that a second record is in the active state.

14. A time tracking system comprising:
- one or more processors; and
- a computer-readable storage medium having instructions stored thereon which, when executed by the one or more processors, cause the time tracking system to:
  - provide a multi-tabbed web-browser that includes a plurality of records, wherein each record in the plurality of records is defined by separate tabs or sub-tabs within the multi-tabbed web-browser, wherein the multi-tabbed web-browser is hosted in a cloud computing environment;
  - activate a timer corresponding to a record to generate a record-specific session associated with the record in an active state, wherein the record in the active state is the record on a tab or a sub-tab that is selected for display on a graphical user interface;
  - identify a first session type of the record-specific session based on activity occurring within the tab or the sub-tab, and
  - detect a change in the activity;
  - in response to detecting a change in the activity, identify a second session type and record a duration of the first session type to determine whether a time limit of the activity has been exceeded;
  - end the record-specific session in response to a record-specific session-ending event, wherein the record-specific session-ending event comprises a detection of a change in a display on the graphical user interface such that the tab or the sub-tab is no longer selected for display, wherein the change indicates that the record is in the inactive state, wherein ending the record-specific session comprises deactivating the timer; and
  - record a duration of the record-specific session associated with the record, wherein the duration of the record-specific session includes the duration of the first session type and a duration of the second session type.

15. The time tracking system of claim 14, wherein the instructions, when executed by the one or more processors, further cause the time tracking system to:
- receive a deactivation selection of the timer during the record-specific session associated with the record in the active state;
- in response to receiving the deactivation selection, deactivate the timer;
- receive a reactivation selection during the record-specific session associated with the record in the active state; and
- in response to receiving the reactivation selection, reactivate the timer.

16. The time tracking system of claim 14, wherein each record in the plurality of records is defined by sub-tabs within a single tab in the multi-tabbed web-browser.

17. The time tracking system of claim 14, wherein the instructions, when executed by the one or more processors, further cause the time tracking system to track a duration of activities during the record-specific session associated with the record.

* * * * *